(12) United States Patent
Wada et al.

(10) Patent No.: US 6,468,341 B2
(45) Date of Patent: Oct. 22, 2002

(54) PIGMENT COMPOSITIONS, PRODUCTION PROCESS THEREOF, COLORANTS, AND COLORED ARTICLES

(75) Inventors: Nobuto Wada; Kazutaka Aoki; Yutaka Nakagawa; Shotoku Takami; Michiei Nakamura, all of Tokyo (JP)

(73) Assignee: Dainichiseika Color & Chemicals, Tokyo (JP)

( * ) Notice: Subject to any disclaimer, the term of this patent is extended or adjusted under 35 U.S.C. 154(b) by 0 days.

(21) Appl. No.: 09/773,917

(22) Filed: Feb. 2, 2001

(65) Prior Publication Data

US 2001/0047740 A1 Dec. 6, 2001

(30) Foreign Application Priority Data

Feb. 4, 2000 (JP) .......................... 2000-028411
Jun. 21, 2000 (JP) .......................... 2000-186722

(51) Int. Cl.$^7$ .......................... C09B 67/50; C09B 47/04
(52) U.S. Cl. .................. 106/413; 106/410; 106/411; 106/412; 106/494; 106/495; 106/496; 106/497; 106/498
(58) Field of Search ................ 106/410, 411, 106/412, 413, 493, 494, 495, 496, 497, 498

(56) References Cited

U.S. PATENT DOCUMENTS 4,069,064 A * 1/1978 Nett et al. .................. 106/218
4,224,222 A * 9/1980 Spietschka et al. ......... 540/136
4,386,966 A * 6/1983 Fitzgerald .................. 106/410
4,460,727 A   7/1984 Shoji
4,709,021 A * 11/1987 Donegan et al. ......... 106/31.76
4,801,638 A * 1/1989 Langley et al. ............. 106/410

FOREIGN PATENT DOCUMENTS

JP    59-116755    *    7/1984
JP     9-59531    *    3/1997
JP     9-95638    *    4/1997

* cited by examiner

Primary Examiner—Anthony J. Green
(74) Attorney, Agent, or Firm—Oblon, Spivak, McClelland, Maier & Neustadt, P.C.

(57) ABSTRACT

A pigment composition comprises a wet-ground pigment mixture of (A) ε-copper phthalocyanine and (B) at least one pigment selected from a group consisting of condensed polycyclic pigments and azo pigments. The weight ratio of the component (A) to the component (B) is 100:0.1 to 100:50. The pigment composition can be produced by wet-grinding (A-1) α-copper phthalocyanine and the component (B) at a weight ratio of from 100:0.1 to 100:50 in a non-aromatic solvent. A colorant comprises the pigment composition and at least one component selected from the group consisting of film-forming resins and liquid media. A colored article can be obtained using the colorant as a coloring agent.

25 Claims, 1 Drawing Sheet

PIGMENT COMPOSITIONS, PRODUCTION PROCESS THEREOF, COLORANTS, AND COLORED ARTICLES

BACKGROUND OF THE INVENTION a) Field of the Invention

This invention relates to pigment compositions, a production process thereof, colorants and colored articles. More specifically, it is an object of the present invention to provide pigment compositions comprising, as a principal component, pronouncedly reddish ε-copper phthalocyanine (hereinafter abbreviated as "the component A" or "the ε-form") and suitable for a variety of coloring applications.

b) Description of the Related Art

Among all pigments, copper phthalocyanine pigment is especially stable, is excellent in a variety of fastness, and has many crystal forms. Of these crystal forms, those known to have already found actual industrial use include α-copper phthalocyanine (hereinafter abbreviated as "the component A-1" or "the α-form"), β-copper phthalocyanine (hereinafter abbreviated as "the β-form"), and the ε-form. It is a common practice to use the β-form in applications to impart a greenish blue color and the α-form in applications to impart a reddish blue color. The ε-form is, however, employed when impartation of a blue color more reddish than that available from the use of the α-form is required.

In a variety of coloring applications, however, there is an outstanding demand to impart a blue color still more reddish than that available from the use of the ε-form. Such a pronouncedly reddish color tone cannot be realized with a single copper phthalocyanine pigment. In general, there is hence no choice other than relying upon use of a mixture of copper phthalocyanine and a pigment more reddish than copper phthalocyanine. Mixing of two or more pigments, however, leads to a reduction in tone when they are mixed in the form of powders or colorants and are then used. Therefore, the color tone so obtained is unavoidably accompanied with reductions in saturation and vividness and also with a decrease in transmittance.

With a view to lessening these problems, attempts have been made to mix two or more pigments in the course of conditioning such that the resulting pigment mixture shows a behavior similar to a single pigment. Such attempts include, for example, dry grinding of a phthalocyanine pigment and another pigment into a pigment mixture. Even with the pigment mixture obtained by this method, however, tinting power and vividness are still insufficient.

As a method for lessening the above-described drawbacks of dry grinding and imparting better homogeneity to the resulting mixed pigment, it has also been proposed to produce a pigment mixture by wet grinding. The pigment mixture obtained by this method is excellent in both dispersibility and vividness, but fails to exhibit particularly good properties in heat resistance, solvent resistance, light fastness and weatherability.

Even if the processing of pigments is performed by grinding as described above or by another method, a pigment mixture which can produce the above-described still more reddish blue color cannot be obtained unless the processing forms only the ε-crystal form, which shows a blue tone with a reddish-purple tinge, as the crystal form of the processed copper phthalocyanine pigment as a base colorant.

It is also known to form copper a phthalocyanine pigment and another pigment into a pigment composition by dissolving them in sulfuric acid and then causing them to co-precipitate in water. However, the copper phthalocyanine pigment in the pigment composition obtained by this process has all been transformed into the α-form, so that the color tone of the copper phthalocyanine pigment itself as a color base is more greenish than the ε-form. This process, therefore, cannot provide a pigment which produces the above-described still more reddish blue color.

SUMMARY OF THE INVENTION

An object of the present invention is, therefore, to eliminate the above-described drawbacks of the conventional art and to provide a copper phthalocyanine pigment composition comprising a mixture of the more reddish ε-form and another pigment and capable of producing a vivid reddish-blue color.

The present inventors have proceeded with extensive research to achieve the above object. As a result, it has been found that a pigment composition, which comprises the ε-form as a principal component and is a more homogeneous mixture, can be obtained by transforming the α-form into the ε-form in a pigment mixture of the α-form and another pigment, leading to the completion of the present invention.

The above-described object can be achieved by the present invention to be described hereinafter. Described specifically, the present invention provides a pigment composition comprising a wet-ground pigment mixture of the following components (A) and (B):

(A) ε-copper phthalocyanine, and (B) at least one pigment selected from a group consisting of condensed polycyclic pigments and azo pigments;

wherein a weight ratio of the component (A) to the component (B) is 100:0.1 to 100:50.

A first process according to the present invention for the production of the pigment composition comprises wet-grinding (A-1) α-copper phthalocyanine and the component (B) at a weight ratio of from 100:0.1 to 100:50 in a non-aromatic solvent.

A second process according to the present invention for the production of the pigment composition comprises dry-grinding the components (A-1) and (B) at a weight ratio of from 100:0.1 to 100:50 to obtain a dry-ground pigment mixture; and then wet-grinding the dry-ground pigment mixture in a non-aromatic solvent.

A third process according to the present invention for the production of the pigment composition comprises adding (A-2) copper phthalocyanine of any crystal form and the component (B) at a weight ratio of from 100:0.1 to 100:50 into an at least 60 wt. % aqueous solution of sulfuric acid; pouring the resultant aqueous sulfuric acid solution into water to have the component (A-2) transformed in crystal form into the α-form such that a pigment mixture of the component (A-1) and the component (B) is obtained; and then wet-grinding the thus-obtained pigment mixture of the component (A-2) and the component (B) in a non-aromatic solvent.

In all applications, for example, in coloring plastics, paints, printing inks, textile printing agents, electrophotographic toners, color filters, ink-jet inks, heat transfer inks and the like, the pigment composition according to the present invention is useful as a colorant improved in heat resistance, solvent resistance, light fastness and weatherability while producing a color tone more pronouncedly reddish than conventional copper phthalocyanine pigments without causing reductions in saturation and vividness and a decrease in transmittance.

DETAILED DESCRIPTION OF THE INVENTION AND PREFERRED EMBODIMENTS

Figure 1:
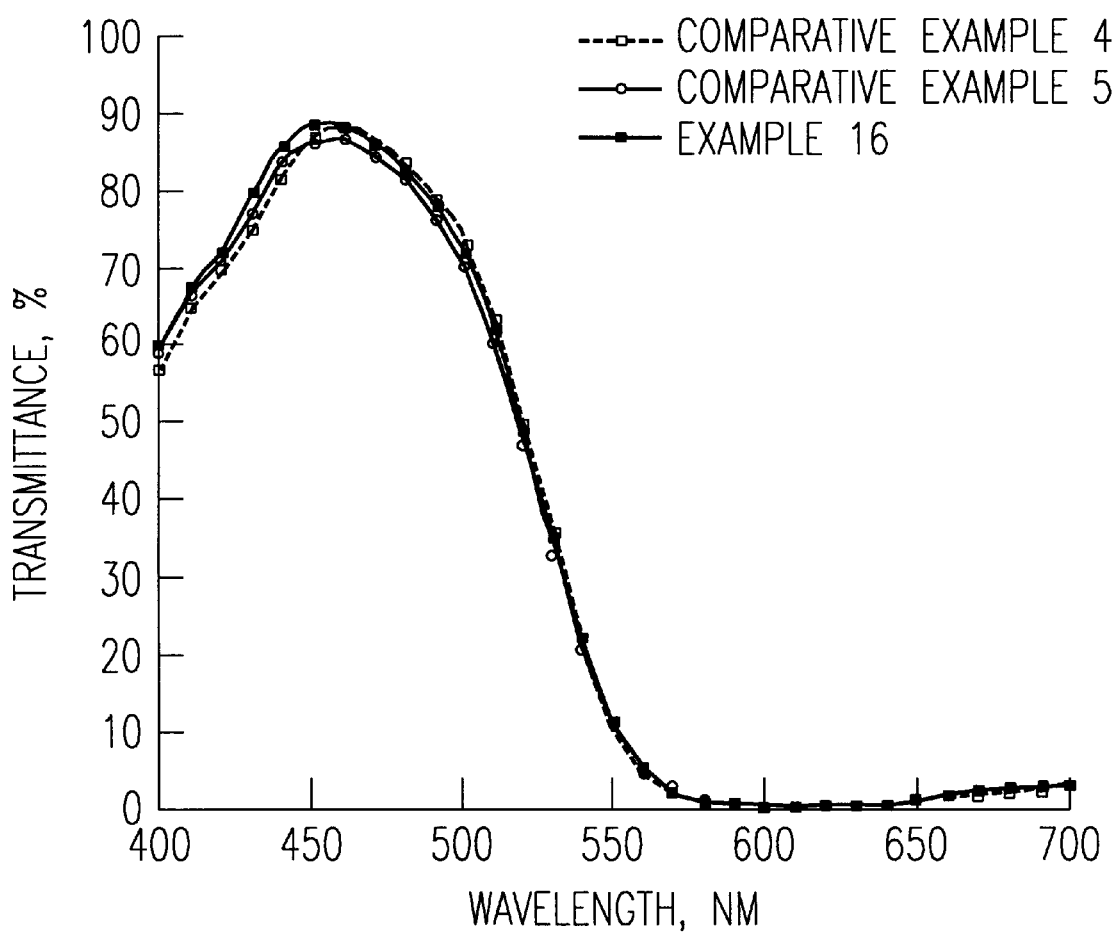
FIG. 1 is a diagram showing spectral transmittance curves of prebaked films obtained from base colors of Example 16 and Comparative Examples 4 and 5.

The present invention will hereinafter be described in further detail based on preferred embodiments.

The pigment composition according to the present invention contains the component (A) (ε-form) and the component (B) [a pigment other than the component (A)]. On the other hand, the first to third processes according to the present invention for the production of the pigment composition are each characterized in that in a mixed system of the component (A-1) (α-form) or the component (A-2) (copper phthalocyanine of any crystal form) and the component (B), the component A-1 or the component A-2 is transformed in crystal form into the component A.

Firstly, a description will be made about the individual components which make up the pigment composition according to the present invention. The component (A) itself is known to the public. The component (B) which is mixed with the component (A) is at least one pigment selected from condensed polycyclic pigments and azo pigments. Illustrative of the condensed polycyclic pigments are perylene pigments, perynone pigments, quinacridone pigments, dioxazine pigments, diketopyrrolopyrrole pigments, anthraquinone pigments, quinophthalone pigments, indigo pigments, thioindigo pigments, methine pigments, azomethine pigments, metal complex pigments, and derivatives thereof. On the other hand, illustrative of the azo pigments are insoluble azo pigments, polyazo pigments, and derivatives thereof. Among these, preferred are pigments having a royal purple, purple, reddish purple, deep red or red color tone, and particularly preferred are pigments having a color tone of a royal purple color inclining toward blue to a purple color.

Incidentally, the term "derivatives thereof" means those containing, on the above-described individual pigments, one to several substituent groups such as nitro groups, primary, secondary or tertiary amines, sulfonic groups or salts thereof, phthalimidomethyl groups, carboxybenzamidomethyl groups, methyl groups having primary, secondary or tertiary amino groups, carbonylmethyl groups, sulfonamido groups, sulfonamido groups having primary, secondary or tertiary amino groups, phenylacetyl groups, and/or carboxyl groups or salts thereof. Among these, preferred are pigment derivatives having a royal purple, purple, reddish purple, deep red or red color tone, and particularly preferred are pigment derivatives having a color tone of a royal purple color inclining toward blue to a purple color.

The pigment composition according to the present invention comprises the component (A) and the component (B) as essential components, and may preferably contain, as the component(C), at least one compound selected from the group consisting of (C-1) copper phthalocyanine derivatives each of which contains one or more substituents on a benzene ring thereof and (C-2) compounds each of which is available from an aromatic isocyanate compound and an aliphatic, primary or secondary amine containing at least one secondary or tertiary amino group.

Illustrative of the components (C-1) are copper phthalocyanine derivatives each of which contains, a benzene ring, one to several substituent groups such as nitro groups, primary, secondary or tertiary amines, sulfonic groups or salts thereof, phthalimidomethyl groups, carboxybenzamidomethyl groups, methyl groups having primary, secondary or tertiary amino groups, carbonylmethyl groups, sulfonamido groups, sulfonamido groups having primary, secondary or tertiary amino groups, phenylacetyl groups, and/or carboxyl groups or salts thereof. These derivatives have been used for many years to improve Theological properties, such as viscosity and flow property when copper phthalocyanine pigment is dispersed in paint, ink or like vehicles, and also stability in liquid colorants, such as anitflooding property of the pigment and antiflocculation property of the dispersed pigment particles. These conventionally known derivatives are all usable in the present invention. Particularly preferred examples of these components (C-1) are represented by the following formula (A):

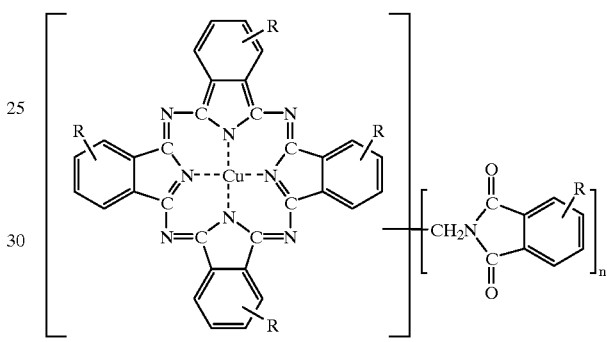

(A)

wherein R is a hydrogen atom or a desired substituent, and n stands for 1 to 2. The desired substituent may preferably be a halogen atom.

The components (C-2) are known as compounds which, when wet-ground with the component (A-1), converts the component (A-1) into the component (A) (JP 2-54868 B). Such conventionally-known compounds are all usable. Illustrative of the components (C-2) are those available by reacting an aliphatic, primary or secondary amine having at least one secondary or tertiary amino group—such as an N-alkylamine, N,N-dialkylalkylenediamine, polyalkylenepolyamine, spermine or spermidine—as a second amine with a diisocyanate compound obtained by reacting, at a ratio of 1 mole to 2 moles, a first diamine, which may contain a secondary or tertiary amino group, with one or more aromatic diisocyanates such as phenylene diisocyanate, tolylene diisocyanate, 4,4'-diphenylmethane diisocyanate, tolidine diisocyanate, xylylene diisocyanate, 1,5-napthhalene diisocyanate and/or tetramethylxylylene diisocyanate. Preferred are those containing at least two secondary or tertiary amino groups, and particularly preferred are those containing three or more secondary or tertiary amino groups. For example, compounds each of which is obtained by reacting one of the above-described disocyanate compounds with an N,N-bis(aminoalkyl)amine, an N,N-bis(aminoalkyl)-alkyleneamine or the like at a molar ratio of 1:2 and then reacting the reaction product with an N-alkylamine or an N,N-dialkylalkylenediamine at a molar ratio of 1:2 are especially preferred. Particularly preferred examples of the components (C-2) are represented by the following formula (B):

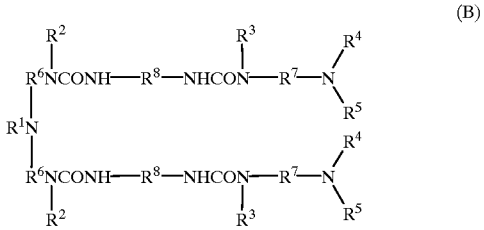

(B)

wherein $R^1$ to $R^5$ each independently represent a hydrogen atom or a $C_1$–$C_4$ alkyl group, $R^6$ and $R^7$ each independently represent —NH— or a $C_2$–$C_6$ alkylene group which may contain one or more —$NR^1$— groups, and $R^8$ represents an arylene group.

The pigment composition according to the present invention comprises the above-described components (A) and component (B), and the weight ratio of the component (A) to the component (B) is 100:0.1 to 100:50, preferably 100:0.1 to 100:20. More preferably, the component (C-1) and/or the component (C-2) may be additionally contained as the component (C) such that the weight ratio of the component (A) to the component (C) is 100:0.1 to 100:30, preferably 100:0.1 to 100:30, more preferably 100:0.5 to 100:20.

A description will next be made of the process according to the present invention for the production of the pigment composition.

(1) First Production Process

The component (A-1) for use in the process of the present invention can be obtained by treating crude copper phthalocyanine by a conventionally-known method such as wet grinding, for example, acid pasting or acid slurrying or dry grinding, for example, salt milling, and no particular limitation is imposed on the production process of the component (A-1).

Examples of the non-aromatic solvent employed upon grinding the mixture of the component (A-1) and the component (B-1) can include glycerin, ethylene glycol, polyethylene glycol, carbitol solvents, cellosolve solvents, and ketone solvents. The crystalline transformation from the component (A-1) into the component (A) becomes easier as the aromaticity of the solvent becomes stronger. It is, however, necessary to carefully choose a solvent because, if the aromaticity of the solvent is excessively strong, the crystalline transformation becomes hardly controllable, resulting in occurrence of the β-form. Particularly preferred is polyhydric alcohols having high viscosity, such as diethylene glycol. The non-aromatic solvent is generally used in an amount 5 to 10 times by weight as much as the total amount of the component (A-1) and the component (B-1) or the total amount additionally including the component (C) if the component (C) is also used, although the amount of the non-aromatic solvent to be used is not limited to the above-described amount.

The proportions of the respective components in the above-described wet grinding are as described above in the description of the pigment composition. The transformation in crystal form from the component (A-1) into the component (A) becomes easier as the component (B) and the component (C) are used in smaller proportions relative to the component (A-1). The above-described transformation in crystal form, however, becomes more difficult as the component (B) and the component (C) are used in greater proportions relative to the component (A-1). Here, difficult transformation in crystal form means that high temperature and/or long time is needed for the transformation in crystal form. On the other hand, easy transformation in crystal form means that the transformation can be completed at low temperature and/or in a short time. However, easy transformation in crystal form involves a potential problem that the transformation may excessively proceeds and the crystal form may change from the α-form to the β-form. The easiness in the crystal form transformation and the stability of the crystal form, therefore, should preferably be balanced depending on the amount of the component (B) and/or the component (C).

Upon conducting the wet grinding, addition of a small amount of the component (A) as a seed in the above-described components is preferred because the time required for the transformation in crystal form can be substantially shortened. The proportion of the component (A) to be used as the seed may preferably range from 0.5 to 20 wt. % based on the total amount of the individual components.

For the wet grinding, apparatuses which have been conventionally employed in the wet grinding of pigments are all usable, including, for example, ball mills, beads mills, sand mills, vertical or horizontal, continuous dispersers with tumbling medium contained therein, kneaders and attritors. Any grinding apparatus can be used, insofar as it permits temperature control and application of strong shear force.

Incidentally, inclusion of the β-form even in a smallest proportion in a grinding system causes prompt occurrence of crystalline transformation from the α-form into the most stable β-form, thereby making it difficult to allow the ε-form to exist stably. Upon wet grinding, it is therefore especially important to avoid mixing of the β-form irrespective of its amount.

Upon wet grinding, use of a grinding aid is not essential. A grinding aid may, however, be used without problem or inconvenience if it is required to control the particle size of the pigments in the finished pigment composition. Usable examples of the grinding aid can include water-soluble inorganic salts known to date, such as sodium chloride, sodium bicarbonate and sodium sulfate. The wet grinding is generally conducted at 60 to 180° C., with 80 to 150° C. being preferred.

(2) Second Production Process

Firstly, the components (A-1) and (B) and the component (C), if added, are dry-ground, and then, the resultant dry-ground mixture is wet-ground in a non-aromatic solvent. The combined use of dry grinding and wet grinding can achieve the mixing of the individual components more completely than in the first production process of the present invention in which only wet grinding is conducted, so that the time required for the transformation of the component (A-1) into the crystal form of the component (A) can be shortened.

Dry grinding is generally used upon producing a mixture of the α-form and the β-form by grinding the β-form. In the present invention, however, the α-form alone is used from the beginning so that a mixture of the α-form and the β-form is by no means formed. Accordingly, dry grinding no longer becomes a cause for the occurrence of the β-form, and is used as an excellent method for completing the crystalline transformation from the component (A-1) into the component (A) in a shorter time.

The proportions of the components (B) and (C) to be used relative to the component (A-1) in the second production process is the same as in the first production process. Firstly, these components are dry-ground. For the effective transformation in crystal form from the α-form into the β-form, it is preferred to grind all the components together in their entirety. As an alternative, it is also possible to conduct dry grinding by using at least portions of the entire portions of the individual components to be employed. This can be effected, for example, by using the whole portion of the component (A-1) together with portion(s) of the other component(s) or by using only portions of the individual components. The individual components may also be used in other ways. No particular limitation is imposed on the proportions of the individual components to be used based on their whole amounts when portions of the whole portions of the components are used in the dry grinding. The proportion of each component to be used may be in a range of from 0.1 to 99.9wt. %, preferably from 30 to 70 wt. % based on its whole amount. A grinding apparatus employed for the dry grinding is the same grinding apparatus as that used for the wet grinding in the first process. The dry grinding is generally conducted at 20 to 100° C., with 30 to 70° C. being preferred. For the dry grinding, a conventionally-known apparatus, for example, a ball mill, an oscillating mill or an attritor can be used. Upon dry grinding, the above-described grinding aid can also be used.

The resultant dry-ground mixture is next subjected to wet grinding. If only a portion of at least one of the components has been dry-ground, the dry-ground mixture is wet-ground together with the remaining portion of the component. As a solvent, a non-aromatic solvent similar to that employed in the first production process is used. The wet grinding can be practiced in exactly the same manner as in the first production process. As in the first production process, the $\epsilon$-form may also be added as a seed as needed. This can shorten the time required for the transformation in crystal form from the $\alpha$-form into the $\epsilon$-form.

(3) Third Production Process

The third production process is different from the first or second production process in that as copper phthalocyanine, copper phthalocyanine the crystal form of which is not specified, in other words, copper phthalocyanine of any crystal form (the component (A-2) is used and also in that the $\alpha$-form formed as fine particles in the presence of the component (B) and/or the component (C) by acid pasting or acid slurrying in the first stage is used. Wet grinding is conducted in the second stage. This is equal to the first or second production process. As the component (A-2), crude copper phthalocyanine can usually be employed irrespective of its production process, although the component (A-2) is not limited to such crude copper phthalocyanine.

The proportions of the components (B) and (C) to be used relative to the component (A-2) in the third production process are the same as the corresponding proportions in the first or second production process. Firstly, upon formation of the $\alpha$-form in the first stage, the component (A-2) is added together with the component (B) and/or the component (C) into an aqueous solution of sulfuric acid, the concentration of which is 60 wt. % or higher. No particular limitation is imposed as to how the individual components are used. For example, all the components can be used in their entirety, or the component (A-2) can be used in its entirety together with the whole portion or a portion of the component (B) and a portion of the component (C). It is, however, preferred to use the whole portion or a portion of the component (B) together with the component (A-2). When only portions of the components (B) and (C) are used, no particular limitation is imposed on the proportions of the used components (B) and (C) based on their whole amounts. Nonetheless, the proportions of the components (B) and (C) to be used may be in a range of from 0.1 to 99.9 wt. %, preferably from 30 to 70 wt. %.

The aqueous solution of sulfuric acid may generally be used in an amount 5 to 30 times by weight as much as the amount of the component (A-2) to be used. No particular limitation is imposed on the temperature of the aqueous solution of sulfuric acid upon adding the individual components, although its temperature may generally be in a range of from 10 to 80° C. No particular limitation is imposed on the manner of addition of the individual components. For example, the individual components may be added after mixing them in advance, may be added at the same time, or may be added separately in a desired order. If the component (B) and/or the component (C) are not soluble in the aqueous solution of sulfuric acid, it is preferred to use them in a form divided beforehand into fine particles so that they can be dispersed in a form as fine as possible. As the component (B), it is preferred to use one soluble in sulfuric acid. Further, if there is a potential problem that these components may be modified with sulfuric acid, it is preferred to use such components by adding them at the time of the below-described wet-grinding instead of adding them to an aqueous solution of sulfuric acid.

Next, the above-prepared aqueous solution of sulfuric acid is poured into a great deal of water such that the component (A-2) is transformed in crystal form into the $\alpha$-form as a precipitate in water. Described specifically, the component (A-2) and the components (B) and (C), all of which are dissolved in the aqueous solution of sulfuric acid, are allowed to precipitate as a uniform mixture in the form of fine particles. Here, the component (A-2) is transformed in crystal form into the component (A-1) The component (A-1) is collected from the aqueous solution by a conventionally-known separation method, thoroughly washed, and then dried.

In the second stage, the mixture which has been obtained in the above-described first step and contains the $\alpha$-form is wet-ground in a non-aromatic solvent. When only portions of the components (B) and/or (C) are used in the first stage, the mixture is wet-ground together with the remaining portions of the components (B) and/or (C). The wet grinding can be conducted in exactly the same manner as in the first production step, and the non-aromatic solvent can be exactly the same as that employed in the first production step. As in the first production process, it is also possible to use the $\epsilon$-form as a seed and to employ a grinding aid.

From the non-aromatic solvent and the dispersing medium, if used, the pigment composition—which has been formed by wet-grinding in any one of the above-described first to third production processes and contains the $\epsilon$-form and the component (B) and if necessary, the component (C)—is separated, washed with water, and then dried by conventionally-known methods. To the pigment composition according to the present invention, conventionally-known pigment treatments, surfactants and/or dipersants—such as rosin, aliphatic amines, the above-described pigment derivatives, and high molecular dispersants such as polyesters of 1,2-hydroxystearic acid and polyesters of 1,2-hydroxyoleic acid, their aminoalkylamides, their salts, naphthyloxyalkyl esters of the polyesters—can be added in any desired step(s) in each of the above-described production processes.

The pigment composition (X) available from the process of the present invention as described above is different in thermal behavior from a pigment composition (Y) prepared by simply mixing the individual components at the same mixing ratio as the pigment composition according to the present invention (for example, mixing them by similar procedures as in dry grinding or toning). It is therefore possible to distinguish them from each other. Described specifically, when the above-described two kinds of pigment compositions (X) and (Y) are measured by using a differential thermal analysis (TG/DTA) apparatus which can also measure weight losses simultaneously during heating, these pigment compositions are different in the temperature range of a feeble exothermic peak ascribed to the component B and associated with a weight loss, thereby making it possible to clearly distinguish from each other the pigment composition (X) obtained by the process of the present invention and the pigment composition (Y) prepared by simple mixing.

The pigment composition (X) according to the present invention is characterized in that it has high transmittance on the side of optically lower wavelengths (420 to 440 nm) than the conventional ε-form pigment composition (Y) and also in that it does not induce such a decrease in transmittance inherent to the conventional ε-form pigment composition (Y). Accordingly, the pigment composition (X) has a color tone of pronouncedly reddish blue and is particularly useful as a colorant for color filters which require such a color tone.

Components which make up a colorant differ depending on the application. No particular limitation is, therefore, imposed on the components (for example, a binder resin, a dispersant, an organic solvent, water, a varnish, plastics, aids, etc.) other than the pigment composition of the present invention as a colorant, and those suited for the application of a colorant are used. No particular limitation is imposed on the content of the pigment composition in the colorant, and the content of the pigment composition in the colorant can be determined as needed depending on the application of the colorant.

The present invention will next be described more specifically based on examples, comparative examples and application examples, in which all designations of "part" or "parts" and "%" are by a weight basis unless otherwise specifically indicated. Incidentally, it was confirmed from a Bragg angle in X-ray diffraction that the copper phthalocyanine in the pigment composition produced in each of the following Examples was of the ε-form.

Comparative Example 1

The α-form (100 parts) obtained by a known process, a copper phthalocyanine derivative with 1 to 2 moles of phthalimidomethyl group(s) bonded to a benzene ring [hereinafter abbreviated as "PIM"; represented below by the formula (I)] (3 parts), the ε-form (C.I. pigment blue 15:6, this will apply equally hereinafter)(10 parts) as a seed, sodium chloride (300 parts) and diethylene glycol (hereinafter abbreviated as "DEG") (110 parts) were wet-ground for 15 hours in a kneader while maintaining the temperature of the contents at 100 to 110° C. The thus-obtained contents were heat-treated in a diluted 2% aqueous solution of sulfuric acid, collected by filtration, washed with water and then dried, whereby a pigment composition with the ε-form contained therein was obtained as a comparative example.

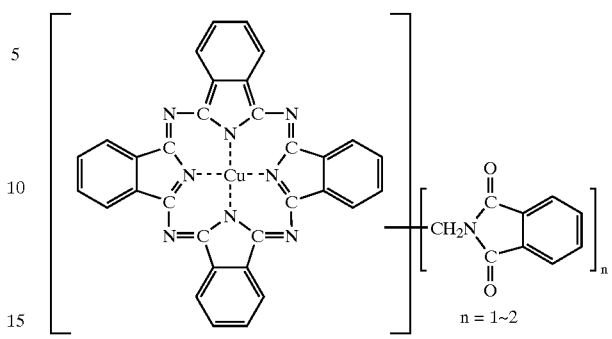

Using a TG/DTA apparatus (manufactured by Seiko Instruments Inc.; "SSC 5200 Thermal Analysis System" (trade name)", the above-described pigment composition was analyzed at a heating rate of 10° C. From around 450° C., a pronounced exothermic peak associated with a weight loss and characteristic to copper phthalocyanine was observed.

EXAMPLE 1

The α-form (100 parts) obtained by a known process, quinacridone violet pigment (C.I. pigment violet 19, this will apply equally hereinafter) (10 parts), the ε-form (10 parts) as a seed, sodium chloride (300 parts) and DEG (110 parts) were wet-ground for 5 hours in a kneader while maintaining the temperature of the contents at 110 to 120° C. The thus-obtained contents were heat-treated in a diluted 2% aqueous solution of sulfuric acid, collected by filtration, washed with water and then dried, whereby a pigment composition according to the present invention was obtained.

EXAMPLE 2

The α-form (100 parts) obtained by a known process, a compound [represented by the below-described formula (II); 5 parts] obtained by reacting N,N-dimethylaminopropyldiamine (2 moles) to a compound (1 mole) obtained by reacting tolylene diisocyanate and N,N-bis (3-aminopropyl)methylamine at a molar ratio of 2:1 in ethyl acetate, quinacridone violet pigment (3 parts), sodium chloride (300 parts) and DEG (110 parts) were wet-ground for 30 hours in a kneader while maintaining the temperature of the contents at 100 to 110° C. The thus-obtained contents were heat-treated in a diluted 2% aqueous solution of sulfuric acid, collected by filtration, washed with water and then dried, whereby a pigment composition according to the present invention was obtained.

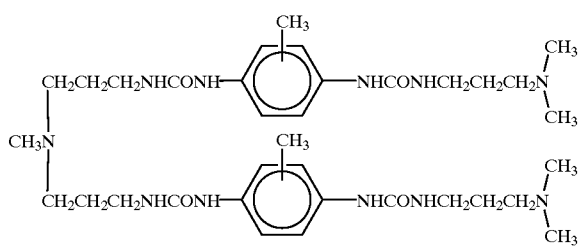

(II)

EXAMPLE 3

The α-form (100 parts) obtained by a known process, PIM (3 parts), dioxane violet pigment (C.I. pigment violet 23, this will apply equally hereinafter) (3 parts), the ε-form (10 parts) as a seed, sodium chloride (300 parts) and DEG (110 parts) were wet-ground for 15 hours in a kneader while maintaining the temperature of the contents at 100 to 110° C. The thus-obtained contents were heat-treated in a diluted 2% aqueous solution of sulfuric acid, collected by filtration, washed with water and then dried, whereby a pigment composition according to the present invention was obtained.

EXAMPLE 4

The α-form (100 parts) obtained by a known process, PIM (3 parts) and dioxane violet pigment (3 parts) were dry-ground for 1 hour in an attritor. The thus-obtained mixture, the ε-form (10 parts) as a seed, sodium chloride (300 parts) and DEG (110 parts) were wet-ground for 7 hours in a kneader while maintaining the temperature of the contents at 100 to 110° C. The thus-obtained contents were heat-treated in a diluted 2% aqueous solution of sulfuric acid, collected by filtration, washed with water and then dried, whereby a pigment composition according to the present invention was obtained.

EXAMPLE 5

The α-form (100 parts) obtained by a known process, the compound (3 parts) represented by the formula (II) and indanthrene blue pigment (C.I. pigment blue 60, this will apply equally hereinafter) were dry-ground for 1 hour in an attritor. The thus-obtained mixture, the ε-form (10 parts) as a seed, sodium chloride (300 parts) and DEG (110 parts) were wet-ground for 7 hours in a kneader while maintaining the temperature of the contents at 100 to 110° C. The thus-obtained contents were heat-treated in a diluted 2% aqueous solution of sulfuric acid, collected by filtration, washed with water and then dried, whereby a pigment composition according to the present invention was obtained.

EXAMPLE 6

The α-form (100 parts) obtained by a known process, PIM (3 parts) and quinacridone violet pigment (3 parts) were dry-ground for 1 hour in an attritor. The thus-obtained mixture, the ε-form (10 parts) as a seed, sodium chloride (300 parts) and DEG (110 parts) were wet-ground for 40 hours in a kneader while maintaining the temperature of the contents at 80 to 90° C. The thus-obtained contents were heat-treated in a diluted 2% aqueous solution of sulfuric acid, collected by filtration, washed with water and then dried, whereby a pigment composition according to the present invention was obtained.

EXAMPLE 7

The α-form (100 parts) obtained by a known process, PIM (10 parts) and quinacridone violet pigment (3 parts) were dry-ground for 1 hour in an attritor. The thus-obtained mixture, the ε-form (10 parts) as a seed, sodium chloride (300 parts) and DEG (110 parts) were wet-ground at 110 to 120° C. for 30 hours in a kneader. The thus-obtained contents were heat-treated in a diluted 2% aqueous solution of sulfuric acid, collected by filtration, washed with water and then dried, whereby a pigment composition according to the present invention was obtained.

EXAMPLE 8

After crude copper phthalocyanine blue (100 parts) obtained by a known process and quinacridone violet pigment (3 parts) were dissolved in 98% sulfuric acid (800 parts), the resulting solution was poured into water (3200 parts) to have a mixture precipitated with the α-form contained therein. The mixture was collected by filtration, washed with water, and then dried. The thus-obtained mixture with the α-form contained therein, PIM (3 parts), the ε-form (10 parts) as a seed, sodium chloride (300 parts) and DEG (110 parts) were wet-ground at 110 to 110° C. for 10 hours in a kneader. The thus-obtained contents were heat-treated in a diluted 2% aqueous solution of sulfuric acid, collected by filtration, washed with water and then dried, whereby a pigment composition according to the present invention was obtained.

EXAMPLE 9

After crude copper phthalocyanine blue (100 parts) obtained by a known process and dioxazine violet pigment (3 parts) were dissolved in 81% sulfuric acid (2000 parts), the resulting solution was added to water (6000 parts) to have a mixture precipitated with the α-form contained therein. The mixture was collected by filtration, washed with water, and then dried. The thus-obtained mixture with the α-form contained therein, PIM (3 parts), the ε-form (10 parts) as a seed, sodium chloride (300 parts) and DEG (110 parts) were wet-ground at 110 to 110° C. for 10 hours in a kneader. The thus-obtained contents were heat-treated in a diluted 2% aqueous solution of sulfuric acid, collected by filtration, washed with water and then dried, whereby a pigment composition according to the present invention was obtained. The pigment composition was subjected to a differential thermal analysis in a similar manner as in Comparative Example 1. As a result, a feeble exothermic peak associated with a weight loss was observed around 395° C., and a pronounced exothermic peak associated with a weight loss was also observed from around 450° C.

EXAMPLE 10

After crude copper phthalocyanine blue (100 parts) obtained by a known process and dioxazine violet pigment (10 parts) were dissolved in 98% sulfuric acid (2000 parts), the resulting solution was poured into water (6000 parts) to have a mixture precipitated with the α-form contained therein. The mixture was collected by filtration, washed with water, and then dried. The thus-obtained mixture with the α-form contained therein, PIM (3 parts), the ε-form (10 parts) as a seed, sodium chloride (300 parts) and DEG (110 parts) were wet-ground at 110 to 110° C. for 10 hours in a kneader. The thus-obtained contents were heat-treated in a diluted 2% aqueous solution of sulfuric acid, collected by filtration, washed with water and then dried, whereby a pigment composition according to the present invention was obtained. The pigment composition was subjected to a differential thermal analysis in a similar manner as in Comparative Example 1. As a result, a feeble exothermic peak associated with a weight loss was observed around 405° C., and a pronounced exothermic peak associated with a weight loss was also observed from around 450° C.

Colorants, which contain pigment compositions of the present, and their application examples will hereinafter be described. Needless to say, the pigment compositions according to the present invention can be used as colorants in all applications other than those to be exemplified below.

EXAMPLE 11

Using as a pigment composition the pigment composition prepared in Example 6 and employing a beads mill of a small capacity, a deep-colored enamel was obtained in accordance with the formula described in Table 1 and further, a white enamel was obtained in accordance with the formula described in Table 2. A tinted blue paint was also obtained by mixing the above-obtained deep-colored enamel and white enamel at a weight ratio of 1:4.

TABLE 1

| Formula of deep-colored enamel | |
| --- | --- |
| Pigment composition | 10.0 parts |
| Alkyd varnish (solid content: 60%) | 88.9 parts |
| Melamine varnish (solid content: 60%) | 22.2 parts |
| Xylol/n-butanol (8:2 mixture by weight ratio) | 20.0 parts |

TABLE 2

| Formula of white enamel | |
| --- | --- |
| Titanium oxide | 30.0 parts |
| Alkyd varnish (solid content: 60%) | 80.0 parts |
| Melamine varnish (solid content: 60%) | 20.0 parts |
| Xylol/n-butanol (8:2 mixture by weight ratio) | 20.0 parts |

EXAMPLE 12

A tinted blue paint was obtained in a similar manner as in Example 11 except that the pigment composition prepared in Example 8 was used in place of the pigment composition of Example 6.

Comparative Example 2

A tinted blue paint was obtained in a similar manner as in Example 11 except that in place of the pigment composition of Example 6, a mixture—which had been obtained by combining the pigment composition prepared in Comparative Example 1 and quinacridone violet pigment such that the mixture contained the same components in the same proportions as the pigment composition of Example 6—was used.

The tinted blue paints of Examples 11, 12 and comparative Example 2 were separately diluted with thinner to a sprayable viscosity (14 seconds as measured by No. 4 Ford cup) and then spray-coated by an air spray gun onto prime-coated steel panels After the spray-coated steel panels were dried at room temperature for 15 minutes, the paints were baked and hardened at 140° C. for 30 minutes, whereby steel panels were prepared. The color tones of the panels, which had been prepared by using the paints of Examples 11 and 12, respectively, were more pronouncedly reddish than the color tone of the panel obtained by using the paint of Comparative Example 2. The coatings obtained from the paints of Examples 11 and 12, respectively, were excellent in chroma and coloring power. Those panels were measured for the chroma and tinting power of their coatings by a photoelectric calorimeter ("SM Color Computer, Model: SM-4", trade name; manufactured by Suga Test Instruments Co., Ltd.). Results are shown in Table 3.

Chroma and coloring power were indicated in terms of values calculated by the following formulas, respectively:

| Chroma: | $C^* = [(a^*)^2 + (b^*)^2]^{1/2}$ |
| --- | --- |
| Coloring power: | $TS = [1 - (V_{yex} - V_{ys})] \times 100$ | wherein $V_{yex}$ is the y value of the paint of Example 11 or 12 and $V_{ys}$ is the y value of the paint of Comparative Example 2.

TABLE 3

| Measurement results of chroma and coloring power | | |
| --- | --- | --- |
| | Chroma increment ($\Delta C^*$) | Coloring power |
| Example 11 | 1.0 | 104 |
| Example 12 | 1.2 | 105 |
| Comp. Ex. 2 | 0.0 | 100 |

EXAMPLE 13

The pigment composition prepared in Example 3 was kneaded as a pigment composition together with DOP (dioctyl phthalate) at 40° C. or lower on a three-roll mill in accordance with the formula described in Table 4, whereby a color paste of 50% pigment content was prepared. The color paste was kneaded together with gelled polyvinyl chloride compound at 160 to 175° C. on a two-roll mill in accordance with the formula described in Table 4. The kneaded mass was taken out of the two-roll mill and was then formed into a sheet at 165 to 175° C. under a load of 150 kg/cm². The sheet was thereafter cooled, whereby a deep-colored sheet of 1 mm in thickness was prepared.

TABLE 4

| Formula of deep-colored sheet | |
| --- | --- |
| Pigment composition | 0.5 part |
| DOP | 0.5 part |
| Polyvinyl chloride compound | 100.0 parts |

The deep-colored sheet so obtained and a white polyvinyl chloride compound were then kneaded at 160 to 165° C. on a two-roll mill in accordance with the formula described in Table 5. The kneaded mass was taken out of the two-roll mill and was then formed into a sheet at 160 to 165° C. under a load of 150 kg/cm². The sheet was thereafter cooled, whereby a tinted sheet of 1 mm in thickness was prepared.

TABLE 5

Formula of tinted sheet

| | |
|---|---|
| Deep-colored sheet | 25.0 parts |
| White polyvinyl chloride compound (content of titanium oxide: 2.6%) | 75.0 parts |

EXAMPLES 14 & 15

A deep-colored sheet and tinted sheet were prepared in a similar manner as in Example 13 except that the pigment compositions prepared in Examples 4 and 9 were used, respectively, in place of the pigment composition of Example 3.

Comparative Example 3

A deep-colored sheet and tinted sheet were prepared in a similar manner as in Example 13 except that in place of the pigment composition of Example 3, a mixture—which had been obtained by combining the pigment composition prepared in Comparative Example 1 and dioxazine violet pigment such that the mixture contained the same components in the same proportions as the pigment composition of Example 3—was used.

The deep-colored sheets of Examples 13, 14 and 15 and Comparative Example 3 were visually observed to determine the vividness and clarity of their color tones. Concerning the tinted sheets Examples 13, 14 and 15 and Comparative Example 3, their coloring power were measured by an instrument similar to that described above and were indicated in terms of similar calculation values. The results are shown in Table 6.

TABLE 6

Measurement results of color tone and coloring power

| | Vividness | Clarity | Coloring power |
|---|---|---|---|
| Example 13 | B | B | 104 |
| Example 14 | A | B | 105 |
| Example 15 | A | A | 106 |
| Comp. Ex. 3 | C | C | 100 |

A: Extremely good,
B: Good,
C: Average

EXAMPLE 16

A colorant (base color) for color filters was prepared by dispersing the pigment composition, which had been prepared in Example 9, in accordance with the formula of Table 7.

TABLE 7

Formula of base color

| | |
|---|---|
| Pigment composition | 15.0 parts |
| Acrylic resin solution | 22.5 parts |
| Dispersant solution | 2.5 parts |
| PGMAc* and other solvent | 60.0 parts |

*PGAc: Propylene glycol monomethyl ether acetate

Comparative Example 4

A base color was prepared in a similar manner as in Example 16 except that the pigment composition prepared in Comparative Example 1 was used in place of the pigment composition prepared in Example 9.

Comparative Example 5

A base color was prepared in a similar manner as in Example 16 except that in place of the pigment composition prepared in Example 9, a mixture—which had been obtained by combining the pigment composition prepared in Comparative Example 1 and dioxazine violet pigment such that the mixture contained the same components in the same proportions as the pigment composition of Example 9—was used.

The base colors of Example 16 and Comparative Examples 4 and 5 were separately coated on glass substrates by a spin coater and then prebaked. The thus-coated glass substrates were measured for light transmission properties by "COLORCOM C" (trade name; manufactured by Dainichiseika Color & Chemicals Mfg., Co., Ltd.). The values shown in Table 8 were obtained. Further, those prebaked films were measured by a spectrophotometer. Their spectral transmittance curves are shown in FIG. 1.

TABLE 8

Light transmission properties of glass substrates coated with blue base colors

| | Y | x | v |
|---|---|---|---|
| Example 16 | 20.8 | 0.142 | 0.154 |
| Comp. Ex. 4 | 20.8 | 0.140 | 0.154 |
| Comp. Ex. 5 | 19.5 | 0.143 | 0.154 |

To evaluate the heat resistance of the coated glass substrates, the coated glass substrates were left over for 1 hour in an atmosphere heated at 250° C. and then, were calorimetrically measured. As indexes of heat resistance, color differences (ΔEab* (heat resistance)) before and after the heat resistance test were determined. To evaluate the light fastness of coated glass substrates, the base colors of Example 16 and Comparative Examples 4 and 5 were coated on glass substrates by a spin coater, respectively. Subsequent to prebaking, the coated glass substrates were calorimetrically measured. The individual coated glass substrates were left over for 12 hours in an atmosphere under a 90 mW metal halide lamp and were then calorimetrically measured. As indexes of light fastness, color differences (ΔEab* (light fastness)) after the exposure to light from the metal halide lamp were determined. The results of the above measurements are shown in Table 9.

TABLE 9

Heat resistance and light fastness of glass substrates coated with blue base colors

| | ΔEab* (heat resistance) | ΔEab* (light fastness) |
|---|---|---|
| Example 16 | 1.0 | 0.4 |
| Comp. Ex. 4 | 3.2 | 1.0 |
| Comp. Ex. 5 | 3.9 | 1.3 |

The blue base color obtained in Example 16 was confirmed to have clear superiority in heat resistance and light fastness to the blue base colors of Comparative Examples 4 and 5.

EXAMPLE 17

To obtain a blue (B) color filter film, a photosensitive pigment dispersion of B was obtained in accordance with the formula of Table 10 by using the blue base color of Example 16.

EXAMPLE 18

To obtain a red (R) color filter film, a photosensitive pigment dispersion of R was obtained in accordance with the formula of Table 10 by using a red base color prepared in a similar manner as in Example 16 except a red pigment (C.I. pigment red 177) was used as a pigment instead of using the pigment composition prepared in Example 9.

EXAMPLE 19

To obtain a green (G) color filter film, a photosensitive pigment dispersion of G was obtained in accordance with the formula of Table 10 by using a green base color prepared in a similar manner as in Example 16 except a green pigment (C.I. pigment green 36) was used as a pigment instead of using the pigment composition prepared in Example 9.

TABLE 10

Formulas of Photosensitive Resin Pigment Dispersions R, G and B

|  | R | G | B |
|---|---|---|---|
| Red base color | 75 | — | — |
| Green base color | — | 85 | — |
| Blue base color of Example 16 | — | — | 100 |
| Acrylic resin | 50 | 50 | 50 |
| Trimethylol propane acrylate | 10 | 10 | 10 |
| 2-Hydroxy-2-methylpropiophenone | 2 | 2 | 2 |
| 2,2-Diethoxyacetophenone | 1 | 1 | 1 |
| PGMAc | 37 | 37 | 37 |
| Total | 175 | 185 | 200 |

EXAMPLE 20

To obtain an RGB color filter for use in an LCD color display, a glass substrate which had been treated with a silane coupling agent was set on a spin coater, and was spin-coated with the above-described photosensitive pigment dispersion for R color filters firstly at 300 rpm for 5 second and then at 1,200 rpm for 5 seconds. The thus-coated glass substrate was prebaked at 80° C. for 10 minutes. After a photomask having a mosaic pattern was brought into close contact with the coated glass substrate, the coated glass substrate was exposed at a light quantity of 100 mJ/cm² by using an extra-high pressure mercury vapor lamp. Development and rinsing were then conducted with a specifically-formulated developer and a specifically-formulated rinse, respectively, whereby a red mosaic pattern was formed on the glass substrate.

Subsequently, a green mosaic pattern and a blue mosaic pattern were formed, respectively, by conducting coating and baking with the above-described photosensitive pigment dispersions for G color filters and B color filters as described above, whereby an RGB color filter was obtained. The thus-obtained color filter had excellent spectral transmittance curve characteristics, was excellent in durability such as light fastness and heat resistance, had excellent light transmission property, and was equipped with properties excellent as an LC color filter which features a vivid reddish-blue color tone and high transmission property in particular.

What is claimed is:

1. A pigment composition comprising a wet-ground pigment mixture of the following components (A) and (B):
   (A) ε-copper phthalocyanine, and
   (B) at least one pigment selected from a group consisting of condensed polycyclic pigments and azo pigments;
   wherein a weight ratio of said component (A) to said component (B) is 100:0.1 to 100:50.

2. A pigment composition according to claim 1, wherein said weight ratio of said component (A) to said component (B) is 100:0.1 to 100:20.

3. A pigment composition according to claim 1, wherein said component B is at least one pigment selected from the group consisting of perylene pigments, perynone pigments, quinacridone pigments, dioxazine pigments, diketopyrrolopyrrole pigments, anthraquinone pigments, quinophthalone pigments, indigo pigments, thioindigo pigments, methine pigments, azomethine pigments, metal complex pigments, and derivatives thereof.

4. A pigment composition according to claim 1, wherein said component (B) is at least one pigment selected from the group consisting of C.I. pigment violet 19, C.I. pigment violet 23 and C.I. pigment blue 60.

5. A pigment composition according to claim 1, further comprising the following component (C):
   (C) at least one pigment selected from the group consisting of (C-1) copper phthalocyanine derivatives each of which contains one or more substituents on a benzene ring thereof and (C-2) compounds selected from the group consisting of an aromatic diisocyanate compound reacted with an aliphatic, primary or secondary amine containing at least one secondary or tertiary amino group;
   wherein a weight ratio of said component (A) to said component (C) is 100:0.1 to 100:30.

6. A pigment composition according to claim 5, wherein said weight ratio of said component (A) to said component (C) is 100:0.5 to 100:20.

7. A pigment composition according to claim 5, wherein said component (C) is a compound (C-1) represented by the following structural formula (A):

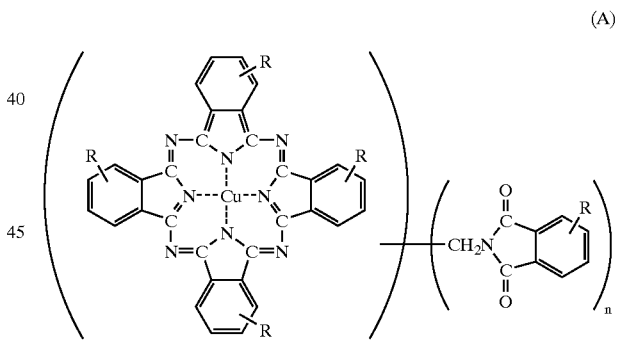

wherein R is a hydrogen atom or a substituent, and n stands for 1 or 2.

8. A pigment composition according to claim 5, wherein said component (C) is a compound (C-2) represented by the following structural formula (B):

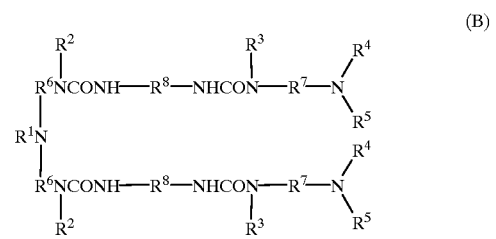

wherein $R^1$ to $R^5$ each independently represent a hydrogen atom or a $C_1$–$C_4$ alkyl group, $R^6$ and $R^7$ each independently represent —NH— or a $C_2$–$C_6$ alkylene group which may contain one or more —$NR^1$— groups, and $R^8$ represents an arylene group.

9. A pigment composition according to any one of claims 1–8 which when analyzed by TG/DTA, shows a feeble exothermic peak associated with a weight loss in a temperature range of from 390 to 420° C. and a pronounced exothermic peak associated with a weight loss in a temperature range of 450° C. and higher.

10. A process for the production of a pigment composition, which comprises wet-grinding the following components (A-1) and (B):
   (A-1) α-copper phthalocyanine, and
   (B) at least one pigment selected from a group consisting of condensed polycyclic pigments and azo pigments,
at a weight ratio of from 100:0.1 to 100:50 in a non-aromatic solvent.

11. A process for the production of a pigment composition, which comprises:
   dry-grinding the following components (A-1) and (B):
   (A-1) α-copper phthalocyanine, and
   (B) at least one pigment selected from a group consisting of condensed polycyclic pigments and azo pigments,
at a weight ratio of from 100:0.1 to 100:50 to obtain a dry-ground pigment mixture; and then
   wet-grinding said dry-ground pigment mixture in a non-aromatic solvent.

12. A process for the production of a pigment composition, which comprises:
   adding the following components (A-2) and (B):
   (A-2) copper phthalocyanine of any crystal form, and
   (B) at least one pigment selected from a group consisting of condensed polycyclic pigments and azo pigments,
at a weight ratio of from 100:0.1 to 100:50 into an at least 60 wt. % aqueous solution of sulfuric acid;
   pouring the resultant aqueous sulfuric acid solution into water to have said component (A-2) transformed in crystal form into α-copper phthalocyanine (component A-1) such that a pigment mixture of said component (A-1) and said component (B) is obtained; and then
   wet-grinding the thus-obtained pigment mixture of the component (A-1) and the component (B) in a non-aromatic solvent.

13. A process according to any one of claims 10–12, wherein the following component (C):
   (C) at least one pigment selected from the group consisting of (C-1) coppoer phthalocyanine derivatives each of which contains one or more substituents on a benzene ring thereof and (C-2) compounds selected from the group consisting of an aromatic diisocyanate compound reacted with an aliphatic, primary or secondary amine containing at least one secondary or tertiary amino group,
   is additionally wet-ground along with said components (A-1) or (A-2) and (B) such that a weight ratio of said component (A) to said component (C) is 100:0.1 to 100:30.

14. A process according to any one of claims 10 to 12, wherein said wet grinding is conducted at 60 to 180° C.

15. A process according to any one of claims 10 to 12, wherein said wet grinding is conducted by adding said component (A) as a seed.

16. A process according to any one of claims 10 to 12, wherein said wet grinding is conducted in the presence of a grinding aid.

17. A process according to any one of claims 10–12, wherein said wet grinding is conducted in the presence of a polyhydric alcohol.

18. A process according to claim 13, wherein said wet grinding is conducted at 60 to 180° C.

19. A process according to claim 13, wherein said wet grinding is conducted by adding said component (A) as a seed.

20. A process according to claim 13, wherein said grinding is conducted in the presence of a grinding aid.

21. A process according to claim 13, wherein said wet grinding is conducted in the presence of a polyhydric alcohol.

22. A pigment composition obtained by a process according to any one of claims 10–12.

23. A colorant comprising a pigment and at least one component selected from the group consisting of film-forming resins and liquid media, wherein said pigment is a pigment composition according to any one of claims 1–8.

24. A method for coloring an article, which comprises using as a coloring agent a colorant according to claim 23.

25. A colored article obtained by a method according to claim 24.

* * * * *